United States Patent

[11] 3,624,805

[72] Inventor Rudolf Hagemuller
 Hassloch, Germany
[21] Appl. No. 34,136
[22] Filed May 4, 1970
[45] Patented Nov. 30, 1971
[73] Assignee Firma Lico AG
 Glarus, Switzerland
[32] Priority May 19, 1969
[33] Germany
[31] P 19 25 328.2

[54] ARRANGEMENT FOR RESETTING MIXING
 TOOLS IN DRUM MIXING MACHINES
 2 Claims, 1 Drawing Fig.
[52] U.S. Cl. .................................................... 259/106,
 15/246.5
[51] Int. Cl. .................................................... B01f 7/00
[50] Field of Search ........................................... 259/106,
 110, 108, 109, 178, 9, 45, 46; 287/58 CT;
 15/246.5

[56] References Cited
 UNITED STATES PATENTS
 888,199 5/1908 Stafford .................... 259/178 R
 1,708,947 4/1929 Jaeger ...................... 259/178 R
 3,336,060 8/1967 Bradford .................. 287/58 CT Primary Examiner—Jordan Franklin
Assistant Examiner—Geo. V. Larkin
Attorney—Robert H. Jacob ABSTRACT: Arrangement for resetting mixing tools in drum mixing machines where mixing tools are coaxially supported by means of adjustable supporting arms in sleeves disposed in a mixing spider, where each sleeve is loosely disposed between two collars and has a plurality of apertures 5 that extend obliquely along its circumference, and the supporting arm has a bore 6 which corresponds in given positions with one of the apertures to place a latching pin therein.

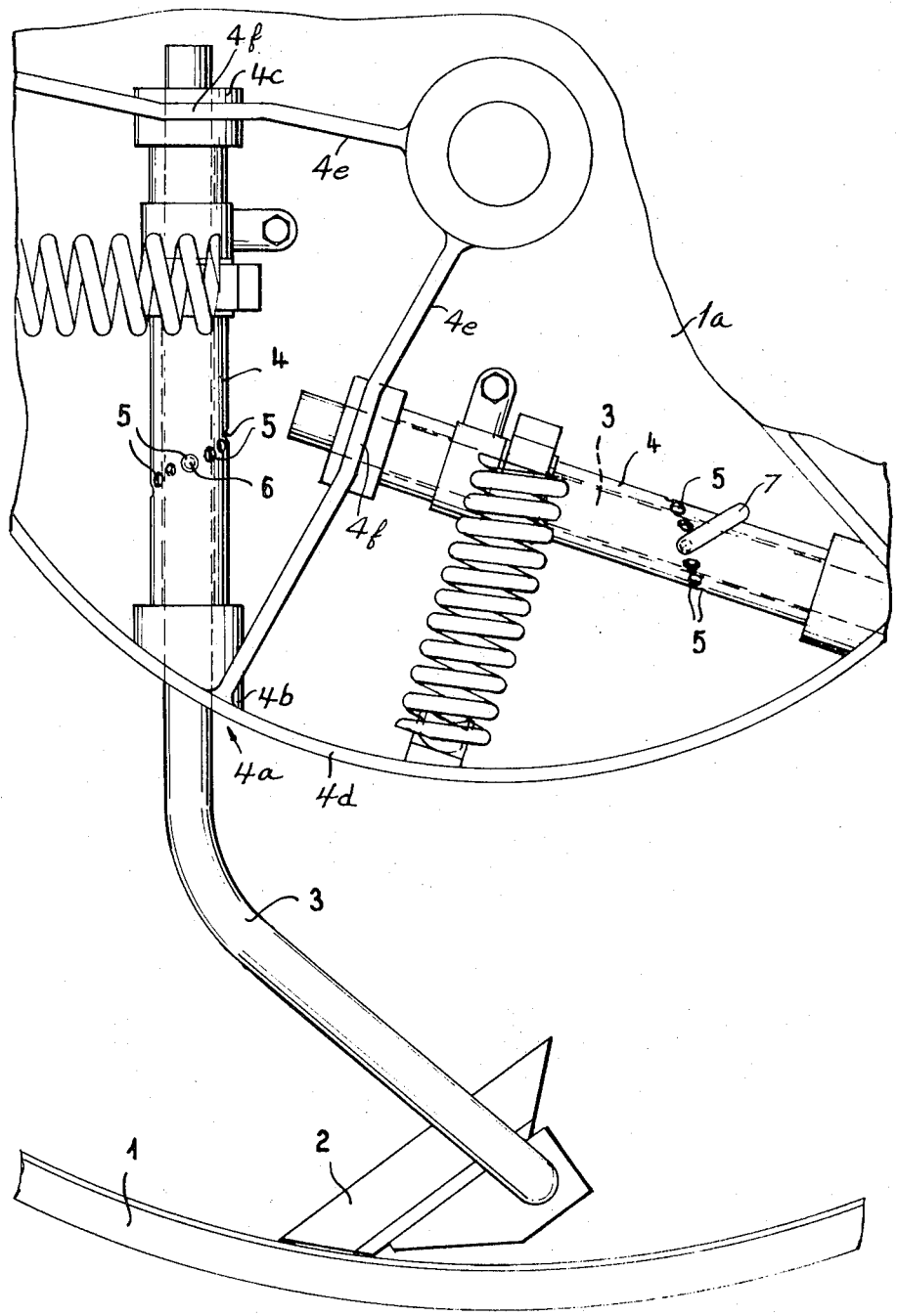

ARRANGEMENT FOR RESETTING MIXING TOOLS IN DRUM MIXING MACHINES

BACKGROUND OF THE INVENTION

The invention relates to an arrangement for resetting mixing tools in drum mixing machines where the mixing tools are journaled coaxially by means of adjustable supporting arms in sleeves disposed in a mixing spider.

Good alignment of the mixing tools with respect to the bottom of the mixing drum and particularly the outer wall of the mixing drum is of considerable importance for the degree of effectiveness of the mixing machine and the quality of the mix produced. A number of arrangements and devices are known which permit the resetting of the mixing tools.

In one known stirring scoop arrangement the mixing scoop is provided with a series of bores which are arranged along a circular arc and which are engaged by a setting pin that is in communication with the mounting of the stirring scoops. Depending on the selection of the bore that is brought into engagement with the stop pin, the stirring scoop assumes a more or less oblique position. The arrangement of the setting means directly on the stirring scoop results first of all in that as the mixing tools are made operative, the setting means becomes soiled immediately, and then resetting or changing of the position is relatively difficult, so that this operation requires at least a thorough cleaning beforehand. Besides, only the angular position of the stirring scoop relative to the stirring arm is adjustable, but no longitudinal adjustment is possible in the area of the stirring arm.

In another known embodiment the mixing tools are journaled at their upper end in a sleeve and are under the resetting force of a spring. The resetting force of this spring is limited by an abutment which can be adjusted by using supporting plates or adjusting screws and thus makes possible an adjustment of the distance of the screws from the bottom of the drum. At best with the use of supporting plates only a step by step adjustment is possible. Also here the adjusting screws are exposed to soiling by the contents of the drum, depending on the height of the bearing sleeve for the arm of the mixing tools they are difficult to reach, so that the soiling, as well as also difficult accessibility, makes flawless and simple operability required in practice questionable.

SUMMARY OF THE INVENTION

It is an object of the invention to provide an arrangement for resetting mixing tools in mixing machines which permits the resetting in simplest fashion, makes possible very fine degrees of adjustment and does not require a large number of loose parts, and which finally is not exposed to soiling by the contents of the mixing drum.

In accordance with the invention the problem is solved in that with the originally described arrangement the sleeve is loosely supported between two collars and has a series of apertures that extend obliquely around its circumference and that the supporting arm is provided with a bore that in any given position corresponds with one of the apertures for inserting a latching pin.

Resetting of the mixing tools can be achieved in simplest fashion in that the latching pin is released, the sleeve turned and the bore in the supporting arm is brought into alignment with the chosen aperture in the sleeve by displacing the same, whereupon the latching pin is again inserted. Due to the obliquely extending series of apertures, the distance of the individual apertures in axial direction of the support arm can be made as small as desired. The arrangement thus makes possible a precision adjustment of the mixing tools that is sufficient to meet all requirements. Soiling of the resetting arrangement by the contents of the drum may be ignored because it is high above the level thereof. The adjusting takes place in the area of the sleeve. Additional means such as abutments, supporting disks, adjusting screws or the like are not required.

DESCRIPTION OF THE DRAWING

An embodiment of the inventive concept is schematically illustrated in the accompanying drawing.

The drawing shows a portion cut out of a plan view onto the relevant parts of a drum mixing machine which are of interest in this connection.

THE INVENTION

Along the mixing drum wall 1 mixing tools 2 are moved which are rigidly supported on supporting arms 3, which in turn serve as intermediate members for the driving, the supporting and the setting of the mixing tools 2 mounted on spider 1a. Among other things, it is of particular importance that the mixing tools 2 are accurately set in their spacial relationship to the mixing drum wall 1 and can suitably be reset in accordance with the wear that results from operation.

For this purpose a sleeve 4 is provided which is coaxially slid upon the supporting arm 3 of the mixing tool 2 and is provided with a series of apertures 5 which can correspond with a bore 6 in the supporting arm 3.

The sleeve 4 is secured and supported on a spider frame 4a between sockets 4b and 4c against sliding in axial direction. On the other hand, the arm 3 of the mixing tool is slidable in the sleeve 4. The outer ends of the arms 4e of the spider frame are connected by an annular portion 4d on which the collars 4b —are mounted. The collars 4c are secured generally centrally of the spider frame arms where they are disposed on both sides of an arm aperture 4f. Sleeve 4 and supporting arm 3 are fixed in their relative positions by a latching pin 7 having an outer gripping end and an end of smaller diameter, which is in any given case passed through an aperture 5 that corresponds to the bore 6 and is passed through the aperture into the bore 6 which extends through arm 3.

Due to the oblique arrangement of the series of apertures 5 in the sleeve 4, alignment of the supporting arm 3 along its longitudinal axis and thereby adjusting of the mixing tool 2 with respect to the wall of the mixing drum 1 can be effected in very fine steps. The drawing shows latch pin 7 on the right carrier arm 3 which is omitted on the left carrier arm to expose apertures 5.

Having now described my invention with reference to the embodiment illustrated in the drawing, what I desire to protect by Letters Patent of the United States Letters set forth in the appended claims.

I claim:

1. In a mixing machine mechanism for resetting mixing tools comprising a mixing drum, a spider frame supported centrally of said drum and having generally radially extending spider arms each provided with an aperture, mixing tools having supporting arms, a sleeve disposed around each said supporting arm, means opposing axial movement of said sleeves, each said supporting arm extending into one said sleeve and one said aperture, a plurality of latching apertures extending obliquely around each said sleeve, a latching pin for each said sleeve and supporting arm and a bore in each said supporting arm proximate said plurality of latching apertures, said bore being adapted to receive a latching pin projected through one said latching aperture.

2. Mechanism in accordance with claim 1, where said spider frame has an annular portion extending around the outer ends of said spider arms and where said means opposing axial movement of said sleeves are sockets, one socket being disposed proximate one end of each said sleeve adjacent a spider arm and the other socket being disposed proximate the other end of each said sleeve adjacent said annular portion.

* * * * *